United States Patent [19]
Klembczyk et al.

[11] Patent Number: 5,487,454
[45] Date of Patent: Jan. 30, 1996

[54] LEAKAGE BELLOWS OF HYDRAULIC DAMPER PROTECTED BY OPPOSITELY WOUND COIL SPRINGS

[75] Inventors: Alan R. Klembczyk, Cheektowaga; John C. Metzger, East Aurora, both of N.Y.

[73] Assignee: Tayco Developments, Inc., North Tonawanda, N.Y.

[21] Appl. No.: 347,872

[22] Filed: Dec. 1, 1994

[51] Int. Cl.⁶ .................................................. F16F 9/04
[52] U.S. Cl. .................... 188/298; 188/322.16; 188/280; 267/226; 267/122; 267/250
[58] Field of Search ..................................... 188/280, 282, 188/298, 312, 313, 318, 322.12, 322.16, 322.17; 267/122, 221, 226, 134, 64.19, 64.23, 64.27, 250

[56] References Cited

U.S. PATENT DOCUMENTS

| | | | |
|---|---|---|---|
| 4,638,895 | 1/1987 | Taylor et al. | 188/280 |
| 4,768,627 | 9/1988 | Taylor | 188/280 |
| 4,815,574 | 3/1989 | Taylor et al. | 188/280 |
| 5,178,241 | 1/1993 | Aubry | 188/298 X |

*Primary Examiner*—Josie A. Ballato
*Attorney, Agent, or Firm*—Joseph P. Gastel

[57] ABSTRACT

A hydraulic damper including a cylinder and a piston rod and a seal for the piston rod and a metal bellows fixedly mounted between the cylinder and the piston rod for accepting leakage of hydraulic fluid from the cylinder, and a spring arrangement encircling the cylinder and piston rod, the spring arrangement consisting of two equal length, equal size springs wound in opposite directions with their outer ends fixed to the cylinder and piston rod and having their inner ends bearing against each other to eliminate the application of torque from the springs to the bellows.

11 Claims, 3 Drawing Sheets

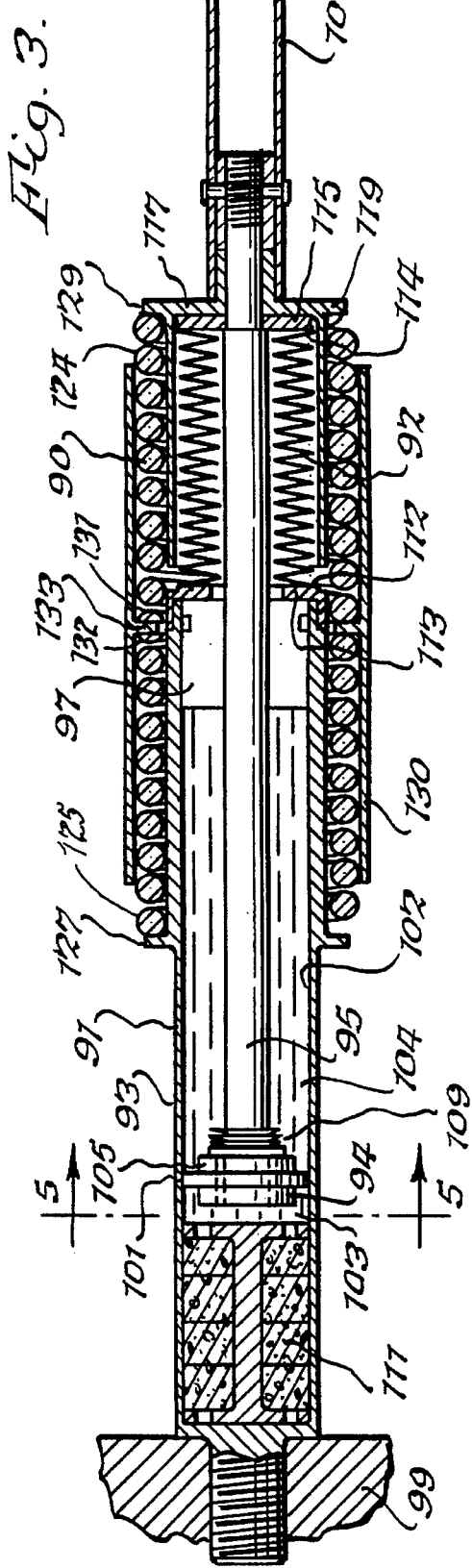

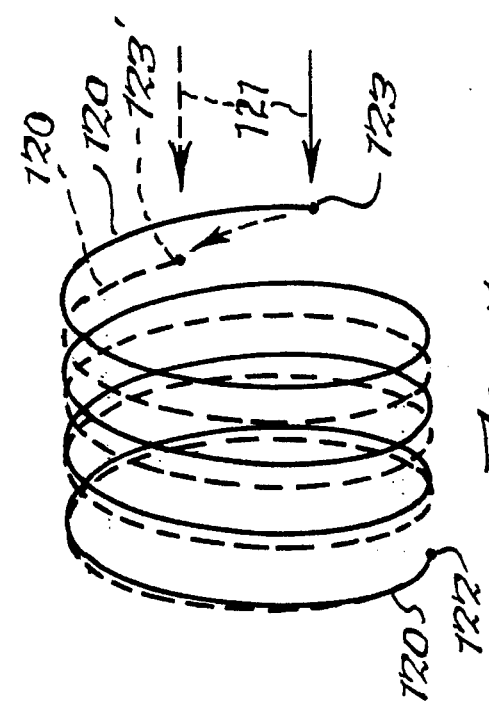
Fig. 7.
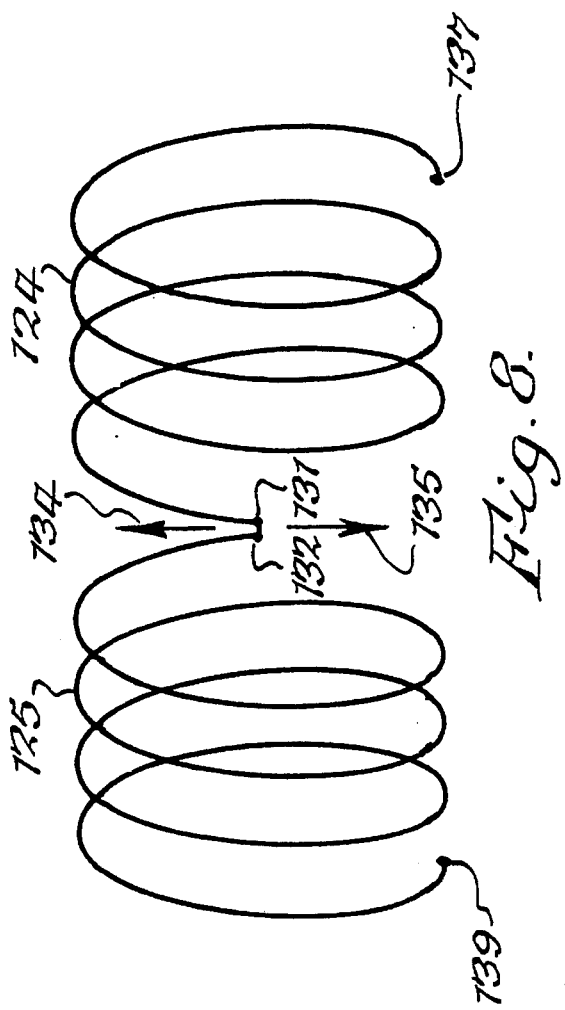
Fig. 8.
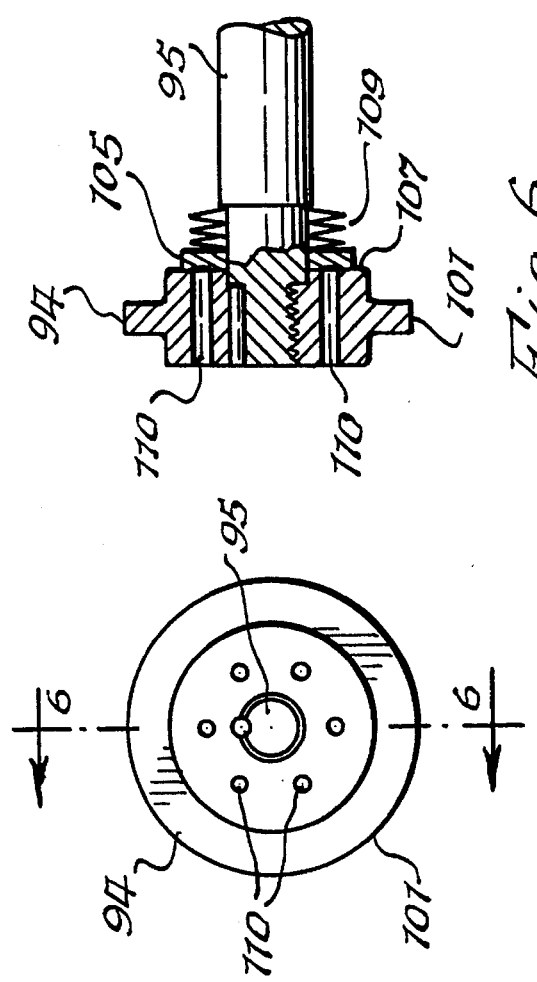
Fig. 6.
Fig. 5.

5,487,454

LEAKAGE BELLOWS OF HYDRAULIC DAMPER PROTECTED BY OPPOSITELY WOUND COIL SPRINGS

BACKGROUND OF THE INVENTION

The present invention relates to a hydraulic damper, or damper-snubber combination which has a seal and bellows for capturing leakage from the seal and which also has an encircling coil spring assembly for carrying a load.

By way of background, dampers and damper-snubbers are shown in prior U.S. Pat. Nos. 4,638,895 and 4,768,627. These devices have seals for the shaft and, as explained in these patents, there is a certain amount of leakage of hydraulic fluid past these seals. However, in order to contain the leakage, metal bellows are used to capture the leaking hydraulic liquid and return it to the cylinders as the piston rod moves into the cylinders. The foregoing structure worked perfectly satisfactorily as long as there were no torsional forces exerted on the bellows which could wrinkle and tear it because of its fragile nature, considering that it was fabricated of thin, flexible metal. However, when dampers and damper-snubbers of the foregoing types were to be used with an encircling coil spring to carry a load, the spring could exert a torsional force between the piston rod and the cylinder and thus exert a torsional force on the bellows which could wrinkle and tear it. Various remedial constructions were suggested for compensating for the torsional forces produced by a single spring. These included providing a keyway between the piston rod and the seal and also the use of ball bearings at the ends of the springs. The keyway was deficient in that it exerted a frictional force on the assembly. Ball bearings also created a certain amount of friction, but more importantly, they added considerable expense to the structure.

SUMMARY OF THE INVENTION

It is the primary object of the present invention to provide a hydraulic damper or damper-snubber having a seal and a bellows associated therewith and also having an encircling coil spring constructed in such a manner that it does not exert a torsional force on the bellows.

Another object of the present invention is to provide a structure as described in the immediately preceding paragraph which is extremely simple and relatively inexpensive and which can be fabricated in a simple and expedient manner. Other objects and attendant advantages of the present invention will readily be perceived hereafter.

The present invention relates to a hydraulic damper and spring combination comprising a cylinder, a chamber in said cylinder, fluid in said chamber, an end wall in said cylinder, a seal in said end wall, a piston head in said chamber, a piston rod mounting said piston head and passing through said seal and having an external piston rod portion on the opposite side of said end wall from said chamber, a bellows, a first end on said bellows in fluid tight relationship to said end wall on the opposite side thereof from said chamber, a second end on said bellows affixed in fluid tight and encircling relationship to said external piston rod portion whereby any leakage from said chamber through said seal is received in said bellows, a first spring wound in a first direction having a first end portion encircling said cylinder and having a first outer end bearing against a portion of said cylinder, a second spring encircling said external piston rod portion and wound in a second direction which is opposite to said first direction and having a second outer end in effective bearing relationship with said external piston rod portion, and first and second inner ends on said first and second springs, respectively, effectively bearing against each other whereby said inner ends of said first and second springs will travel in the same direction as said springs expand and contract to thereby eliminate the application of torsional forces from said springs to said bellows.

The various aspects of the present invention will be more fully understood when the following portions of the specification are read in conjunction with the accompanying drawings wherein:

BRIEF DESCRIPTION OF THE DRAWINGS

FIG. 3 is a fragmentary cross sectional view, taken substantially along line 3—3 of FIG. 4, of a damper-snubber having a seal and a metal bellows for containing leakage past the seal and also having a spring arrangement which does not exert a torsional force on the metal bellows;

FIG. 4 is a fragmentary side elevational view of the damper-snubber of FIG. 3;

FIG. 5 is a view taken substantially in the direction of arrows 5—5 of FIG. 3 and showing one face of the piston head;

FIG. 6 is a fragmentary cross sectional view taken substantially along line 6—6 of FIG. 5 and showing a detail of the piston head;

FIG. 7 is a diagrammatic view showing how a helical spring can produce a torque as it is shortened; and FIG. 8 is a diagrammatic view showing how the inner ends of two helical springs wound in opposite directions will travel in the same direction.

DESCRIPTION OF THE PREFERRED EMBODIMENTS

Figure 1:
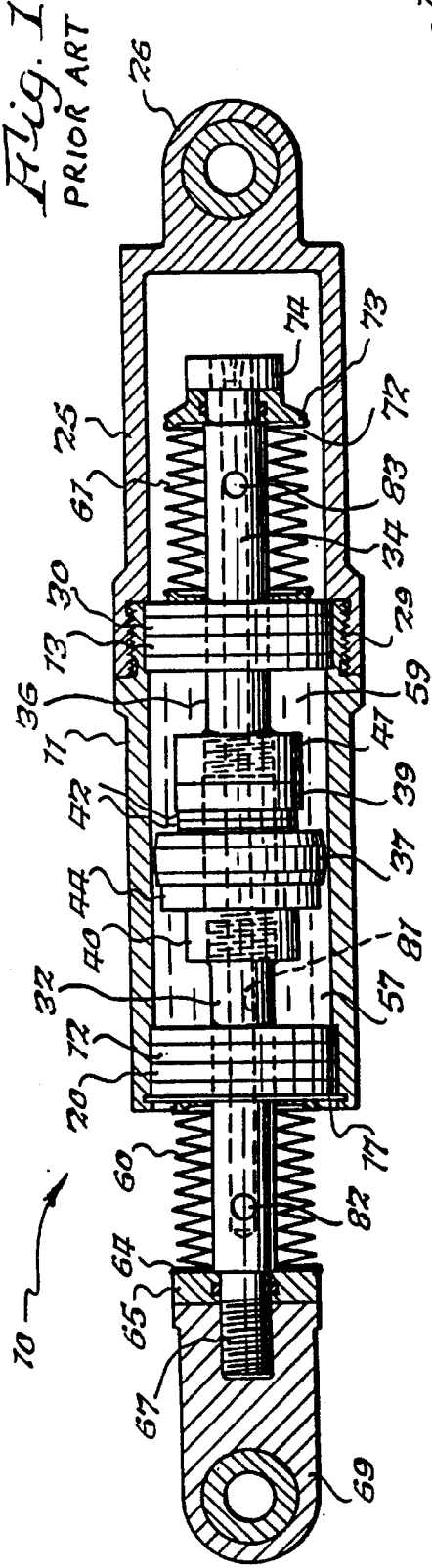
FIG. 1 is a cross sectional view of a prior art damper-snubber shown in U.S. Pat. No. 4,638,895 having frictionless seals and metal bellows for containing the leakage past the seals.
Figure 2:
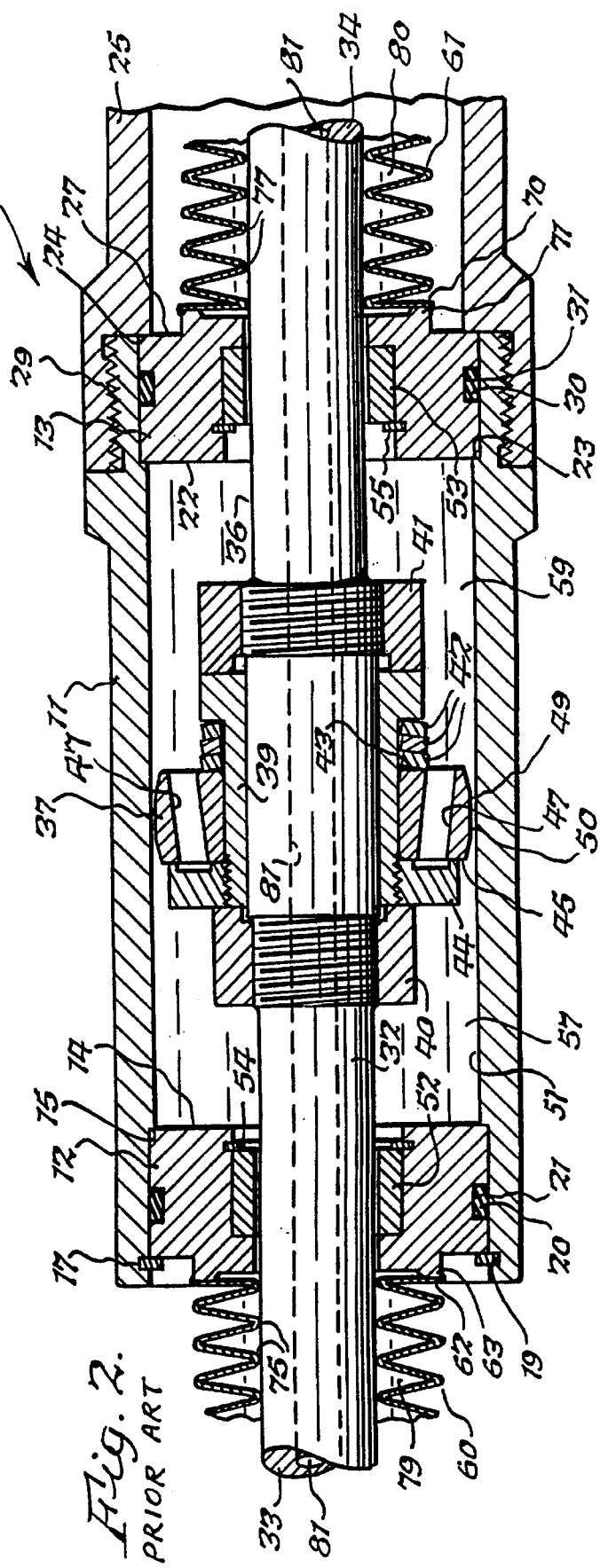
FIG. 2 is an enlarged fragmentary cross sectional view of a portion of the frictionless damper-snubber of FIG. 1.

The prior art frictionless damper 10 of FIGS. 1 and 2 is shown in U.S. Pat. No. 4,638,895 and, as stated therein, comprises an annular cylinder 11 having cylindrical end walls 12 and 13 mounted therein. End wall 12 includes a side 14 which has its outer edge held in abutting relationship with annular shoulder 15 by split ring 17 which is suitably retained in groove 19. An O-ring seal 20 is located in groove 21 to provide sealing against leakage. The outer annular edge of face 22 of end wall 13 abuts shoulder 23 of cylinder 11, and the shoulder 24 of cylinder extension 25 bears against the outer edge of end wall face 27 to retain it in position. An O-ring 30 is located in groove 31 to provide sealing between end wall 13 and cylinder 11. Cylinder extension 25 is threaded onto cylinder 11 at 29, and it has an attachment member 26 at its outer end for attachment to an external object.

A shaft 32 has a central portion 36 which is located in the space between end wall faces 14 and 22 and it also includes outer end portions 33 and 34 which extend varying amounts through and beyond end walls 12 and 13, respectively, depending on the position of piston head 37 which is mounted on the central portion 36 of the shaft. Piston head 37 is mounted on sleeve 39 which is held in position by nuts 40 and 41 threadably secured to the shaft. A plurality of Bellville washers 42 bear against face 43 of piston 37, and valve member 44 bears against face 45 to normally close the plurality of circumferentially located bores 47. There is a clearance space 49 between the outer periphery 50 of piston head 37 and the inner surface 51 of cylinder 11. The clearance space 49 constitutes a fluidic dampening orifice of the type disclosed in U.S. Pat. No. 3,722,640.

The outer end portions 33 and 34 of shaft 32 are supported for rectilinear sliding movement in labyrinth seals 52 and 53, respectively, suitably mounted in cavities in end walls 12 and 13, respectively, and retained therein by split rings 54 and 55, respectively. There is a slight clearance between shaft portions 33 and 34 and their labyrinth seals 52 and 53, respectively, to permit shaft 32 to float substantially frictionlessly therein, and thus there can be leakage of fluid from cylinder chambers 57 and 59 on opposite sides of piston head 37 through the seals. It will be appreciated that if O-ring seals or any other type of seals were used instead of the labyrinth seals 52 and 53 with their clearance, there would be a frictional drag on shaft 32 which could exceed approximately 2% of the rated load of the damper, and thus would be considered objectionable for many purposes.

In order to contain the above-mentioned leakage beyond labyrinth seals 52 and 53 within the cylinder 11, metal bellows seals 60 and 61 are mounted in fluid-tight relationship between end walls 12 and 13 and the portions of shaft ends 33 and 34 which extend outwardly beyond end walls 12 and 13. In this respect the annular end 62 of bellows seal 60 is secured, as by soldering or brazing, to annular lip 63 of end wall 12. The opposite annular end 64 of bellows 60 is attached as by soldering or brazing to ring 65 which is held on reduced end portion 67 of shaft 32 by attachment member 69 which connects shaft 32 to an external foreign object. The annular end portion 70 of bellows 61 is suitably attached to annular rim 71 of end wall 13 by soldering or brazing, and the opposite end 72 of bellows 61 is attached to annular member 73 by soldering or brazing. A nut 74 retains member 73 in position. The inner accordion edges 75 and 77 of bellows 60 and 61, respectively, are in substantially touching relationship with shaft portions 33 and 34, respectively, so that the bellows will remain centered relative to the shaft, that is, they will not distort as they are expanded and compressed with movement of shaft 32.

Hydraulic fluid fills the space in cylinder 11 between end walls 12 and 13 including cylinder chambers 57 and 59 on opposite sides of piston 37. Cylinder chamber 57 is in communication with bellows chamber 79 because of the leakage permitted by bellows seal 52. Cylinder chamber 59 is in communication with bellows chamber 80 because of the leakage permitted by labyrinth seal 53. Chambers 79 and 80 are also filled with hydraulic fluid, and thus there is a continuous body of hydraulic fluid within chambers 57, 59, 79 and 80 and labyrinth seals 52 and 53. In order to permit communication between bellows chambers 79 and 80, a bore 81 is provided within shaft 32. Cross ports 82 and 83 are in communication with bore 81 and are also in communication with bellows chambers 79 and 80, respectively. Normally if piston head 37 is moving below a predetermined speed, there will be a low damping force caused by flow of hydraulic fluid between cylinder chambers 57 and 59 through the orifice or clearance 49 and the leakage induced by said low damping force past labyrinth seals 52 and 53 would be practically non-existent, and there will be a flow of fluid between bellows chambers 79 and 80. More specifically, as either bellows 60 or 61 expands, the other will contract and thus fluid will be forced into the expanding bellows by the contracting bellows through the conduits 81, 82 and 83. However, if piston head 37 should move in either direction at a velocity such that substantial damping pressures exist, there may be leakage through the labyrinth seal located in the cylinder chamber which is experiencing high pressure, and this leakage will be compensated for by the communication between bellows chambers 79 and 80. More specifically, additional fluid passing through the seal into one bellows chamber 79 or 80 will pass through conduits 81, 82 and 83 to the other bellows chamber. At this time there will be extremely low pressure in the other cylinder chamber, and this will tend to draw fluid into it from the adjacent bellows chamber. When the damper is in a low pressure condition, and when piston head 37 is moving at a low speed, the pressure in chambers 57, 59, 80 and 81 will be substantially equal. However, when there is a substantial increase in fluid pressure in either cylinder chamber 57 or 59 due to piston head movement at high speed, the pressures in bellows chambers 80 and 81 will still be at substantially the same low value as when the piston head was moving at low speed because of the throttling effect of the labyrinth seal through which leakage occurs. The maintaining of the low pressures in the bellows obviates their distortion and possible fracture which would otherwise occur if they were subjected to high pressures.

The specific valve 44, as shown in FIG. 2, functions in the following manner. If movement of piston head 37 to the left should exceed a predetermined velocity so that there was a pressure force on piston face 45 which was greater than the force exerted on piston face 43 by Bellville washers 42, piston head 37 will move to the right on sleeve 39 to thereby open ports 47 to permit communication therethrough between cylinder chamber 57 and cylinder chamber 59. Bellville washers 42 will return piston head 37 to the position shown in FIG. 2 wherein valve 44 closes ports 47 after the total force on piston face 45 has been reduced to a value which is lower than the spring force of the Bellville washers 42. However, there is no pressure relief if piston 37 moves to the right because there can be no unseating of valve 44 relative to bores 47. It is to be understood that valve 44 will open only when the device functions as a damper in an overload condition when the pressure in cylinder chamber 57 exceeds a predetermined value.

The foregoing description of FIGS. 1 and 2 appears verbatim in columns 2–4 of U.S. Pat. No. 4,638,895. It will be appreciated that in addition to the labyrinth seals described above, the frictionless seals may be of any other type, including but not limited to those shown in U.S. Pat. No. 4,768,627.

Hydraulic dampers of the type described above relative to FIGS. 1 and 2 can be used with an encircling spring for the purpose of supporting a load. Also, hydraulic dampers which have normal (nonfrictionless) seals are used with bellows to retain leakage past the seals, and such dampers can be used with an encircling spring to support a load. In both types of dampers, the spring is essentially mounted in parallel with the damper, and the operation of such a parallel construction is similar to that of the suspension system of an automobile, in that the spring and damper work together to provide optimal attenuation of shock and vibration. However, a problem exists with the foregoing type of configuration in that the linear compression and extension of a coil spring causes a torsional displacement of the ends of the spring relative to each other, thereby imposing a rotational deflection on the metal bellows. This torsional deflection cannot be accepted by the metal bellows without imposing severe stresses which are capable of wrinkling and possibly tearing the delicate bellows element.

In accordance with the present invention an encircling spring structure 90 is mounted on the hydraulic damping device 91 without in any way imposing a torsional force on a metal bellows 92. More specifically, in FIGS. 3–6 a hydraulic damper-snubber 91 is shown having a cylinder 93 within which is located the piston head 94 mounted at the end of piston rod 95 which passes through a suitable seal 97 mounted as an end wall on cylinder 93. Seal 97 can be a frictionless seal or a normal (nonfrictionless seal). One end of cylinder 93 is suitably affixed to an external structure 99 and the outer end of piston rod 95 is suitably affixed to member 100. The piston head 94 (FIGS. 3, 5 and 6) has an outer periphery 101 which has a predetermined clearance with internal chamber wall 102 so that as the piston head moves in either direction fluid will move between chambers 103 and 104 on opposite sides of the piston head. The foregoing occurs when the piston head is moving relatively slowly. However, if the piston head moves relatively rapidly to the left toward its position shown in FIG. 3 at a velocity which exceeds a predetermined velocity, valve 105 will be unseated from piston face 107 against the bias of Bellville spring 109 to thereby permit fluid flow through ports 110 from chamber 103 to chamber 104. Furthermore, the cylinder 93 includes a chamber 111 which functions as an accumulator to receive hydraulic fluid as the piston rod 95 moves into the cylinder and thus occupies more volume therein. When piston head 94 moves to the right in FIG. 3, valve 105 will always remain seated and the flow of hydraulic fluid from chamber 104 to chamber 103 will be around the outer periphery 101 of piston head 94. At this time fluid from accumulator 111 will flow into chamber 103 to compensate for the decreased volume due to the movement of piston rod 95 out of the cylinder. The foregoing structure is conventional in the art.

As noted above, whether seal 97 is frictionless or nonfrictionless, there can be flow of hydraulic fluid from chamber 104 into bellows 92 which has end 112 rigidly affixed in fluid tight relationship, as by brazing or welding, to end wall 113 of cylinder 93. The opposite end 114 of bellows 92 is affixed by welding or brazing in fluid tight relationship to plate 115 which in turn is affixed to the end wall 117 of cylindrical member 119 which is affixed to piston rod 95. Plate 115 is welded in fluid-tight relationship to piston rod 95.

It is mandatory that torsional stresses should not be exerted on bellows 92 in order to avoid wrinkling and tearing of the bellows, which is a very thin, delicate metal member. In the absence of spring assembly 90 encircling cylinder 93 and cylindrical member 119, there would be no torsional forces exerted on bellows 92 as the piston rod 90 moves in and out of cylinder 94. However, if a single spring were placed in encircling relationship to cylinder 93 and cylinder 119, the spring would exert a torsional force onto cylinder 119 and thus exert a torsional force on bellows 92. This can be seen from the diagram of FIG. 7 wherein a spring 120 is shown in solid lines in a normal condition and in dotted lines when an axial force 121 shortening the spring is applied thereto. Under these circumstances, if the end 122 of the spring is held against movement, the end 123 will move to position 123' as the spring is compressed. It will therefore be appreciated that if a single spring were mounted in encircling engagement with cylinders 93 and 119, there would be a torsional force on bellows 92.

In accordance with the present invention, a spring assembly is provided for encircling engagement with a hydraulic damper and which does not exert torsional force on bellows 92, as the spring assembly is lengthened and shortened.

More specifically, the spring assembly 90 includes first and second springs 124 and 125 which are of the same characteristics in all respects including thickness of wire, number of turns, and length, but are oppositely wound. The end of spring 125 bears against collar 127 which is formed integrally with cylinder 93. The end of spring 124 bears against collar 129 of cylinder 119. A cylindrical member 130 encircles springs 124 and 125, and the inner ends 131 and 132 of springs 124 and 125, respectively, bear against inner annular flange 133 within cylindrical member 130. As can be seen from FIG. 3, spring 124 is in encircling engagement with the cylindrical portion of member 119 which lies between spring 124 and bellows 92 and thus prevents contact therebetween which could damage the bellows. Spring 125 is in encircling engagement with the end portion of cylinder 93.

As the piston rod 95 moves into and out of cylinder 93, springs 124 and 125 will be compressed and expand, respectively. Thus, as they are compressed, they will be shortened, and as they expand, they will be lengthened. FIG. 8 shows that the inner ends 131 and 132 will move in direction 134 as the springs are shortened and in direction 135 as the springs are lengthened, considering that the outer ends 137 and 139 of springs 124 and 125, respectively, are fixed against movement. Thus, since the inner ends 131 and 132 of the springs move equal amounts in the same direction because they are wound opposite to each other, the torsional force produced by the inner end of each of the springs is not applied between the piston rod 95 and cylinder 93, but is applied to the adjacent end of the other spring, and since the ends 131 and 132 bear against annular flange 133, the cylindrical member 130 will rotate without transmitting such rotation to bellows 92. Thus, any torsional force of each spring 131 and 132 which could be transmitted to bellows 92 is eliminated.

It can thus be seen that a construction is provided wherein a hydraulic damper having a seal and a bellows to capture leakage also has an encircling spring arrangement which does not exert a torsional force on the bellows.

While a preferred embodiment of the present invention has been disclosed, it will be appreciated that it is not limited thereto but may be otherwise embodied within the scope of the following claims.

What is claimed is:

1. A hydraulic damper and spring combination comprising a cylinder, a chamber in said cylinder, fluid in said chamber, an end wall in said cylinder, a seal in said end wall, a piston head in said chamber, a piston rod mounting said piston head and passing through said seal and having an external piston rod portion on the opposite side of said end wall from said chamber, a bellows, a first end on said bellows in fluid tight relationship to said end wall on the opposite side thereof from said chamber, a second end on said bellows affixed in fluid tight and encircling relationship to said external piston rod portion whereby any leakage from said chamber through said seal is received in said bellows, a first spring wound in a first direction having a first end portion encircling said cylinder and having a first outer end bearing against a portion of said cylinder, a second spring encircling said external piston rod portion and wound in a second direction which is opposite to said first direction and having a second outer end in effective bearing relationship with said external piston rod portion, and first and second inner ends on said first and second springs, respectively, effectively bearing against each other whereby said inner ends of said first and second springs will travel in the same direction as said springs expand and contract to thereby eliminate the application of torsional forces from said springs to said bellows.

2. A hydraulic damper and spring combination as set forth in claim 1 wherein said first and second springs are of substantially equal size.

3. A hydraulic damper and spring combination as set forth in claim 1 wherein said inner ends of said first and second springs bear against a member therebetween which can rotate with said inner ends.

4. A hydraulic damper and spring combination as set forth in claim 3 wherein said first and second springs are of substantially equal size.

5. A hydraulic damper as set forth in claim 3 including a cylindrical member located between said bellows and said second spring.

6. A hydraulic damper as set forth in claim 5 including a second cylindrical member encircling portions of said first and second springs.

7. A hydraulic damper as set forth in claim 6 wherein said first and second springs are of substantially equal size.

8. A hydraulic damper as set forth in claim 6 wherein said member is an internal portion of said second cylindrical member.

9. A hydraulic damper as set forth in claim 1 including a cylindrical member located between said bellows and said second spring.

10. A hydraulic damper as set forth in claim 9 including a second cylindrical member encircling portions of said first and second springs.

11. A hydraulic damper as set forth in claim 1 including a cylindrical member encircling portions of said first and second springs.

* * * * *